(12) United States Patent
Varughese et al.

(10) Patent No.: US 11,501,228 B2
(45) Date of Patent: Nov. 15, 2022

(54) SYSTEM AND METHOD FOR CROWDSOURCED IN-SEAT DELIVERY OF STADIUM CONCESSIONS

(71) Applicants: DENSO International America, Inc., Southfield, MI (US); DENSO CORPORATION, Kariya (JP)

(72) Inventors: Sibu Varughese, Sterling Heights, MI (US); Martin Nespolo, Grosse Pointe Woods, MI (US); Gareth Webb, New Hudson, MI (US); Thomas Krzyzak, Livonia, MI (US); Wilson Yim, Troy, MI (US); Matthew Johnson, Royal Oak, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 161 days.

(21) Appl. No.: 16/942,999

(22) Filed: Jul. 30, 2020

(65) Prior Publication Data
US 2022/0036269 A1 Feb. 3, 2022

(51) Int. Cl.
*G06Q 10/06* (2012.01)
*H04W 4/021* (2018.01)
(Continued)

(52) U.S. Cl.
CPC ..... *G06Q 10/06315* (2013.01); *B60R 25/209* (2013.01); *B60R 25/24* (2013.01);
(Continued)

(58) Field of Classification Search
CPC ......... G06Q 30/0601; G06Q 10/06311; G06Q 30/0238; G06Q 30/0205; G06Q 20/325;
(Continued)

(56) References Cited

U.S. PATENT DOCUMENTS 9,674,684 B1 * 6/2017 Mendelson ........... H04W 4/029
9,688,247 B1 6/2017 Jayaraman et al.
(Continued)

FOREIGN PATENT DOCUMENTS

BR 102014017465 A2 2/2016
CN 104574593 A 4/2015
(Continued)

OTHER PUBLICATIONS

JoyRun.com—Web Pages JoyRun, Jan. 2019, Retrieved from Archive.org Mar. 7, 2022 (Year: 2019).*
(Continued)

*Primary Examiner* — Scott L Jarrett
(74) *Attorney, Agent, or Firm* — Harness, Dickey & Pierce, P.L.C.

(57) ABSTRACT

An ordering management system for a property includes: a location module configured to determine locations of mobile devices that are located within boundaries of the property; a selection module configured to, in response to receipt of an order from a first mobile device for delivery of one or more items to a location of the first mobile device within the boundaries of the property: select one vendor at the property to supply the item(s) of the order; determine a group of the mobile devices based on the location of the first mobile device; and select a second mobile device from the group; a device communication module configured to selectively transmit, to the second mobile device, the location of the selected one vendor and the location of the first mobile device; and a vendor communication module configured to selectively transmit the order to the selected one vendor.

17 Claims, 9 Drawing Sheets

(51) Int. Cl.
  *G06Q 10/08*   (2012.01)
  *G06Q 30/06*   (2012.01)
  *G06Q 50/12*   (2012.01)
  *B60R 25/24*   (2013.01)
  *H04W 76/10*   (2018.01)
  *B60R 25/20*   (2013.01)

(52) U.S. Cl.
  CPC ......... *G06Q 10/083* (2013.01); *G06Q 10/087* (2013.01); *G06Q 30/0633* (2013.01); *G06Q 50/12* (2013.01); *H04W 4/021* (2013.01); *H04W 76/10* (2018.02); *G06Q 2240/00* (2013.01)

(58) Field of Classification Search
  CPC ............... G06Q 20/20; G06Q 30/0635; G06Q 10/0833; G06Q 20/322; G06Q 10/02; G06Q 20/12; G06Q 10/087; G06Q 50/12; G06Q 30/06; G06Q 10/083; G06Q 20/32
  See application file for complete search history.

(56) References Cited

U.S. PATENT DOCUMENTS

| | | | |
|---|---|---|---|
| 9,794,753 | B1 | 10/2017 | Stitt et al. |
| 9,860,701 | B1* | 1/2018 | Fang ..................... H04W 4/80 |
| 9,870,585 | B2* | 1/2018 | Cronin ................... G06Q 50/12 |
| 9,894,492 | B1 | 2/2018 | Elangovan et al. |
| 10,002,479 | B2 | 6/2018 | Oz et al. |
| 10,064,008 | B2* | 8/2018 | Park ..................... H04W 40/244 |
| 10,244,476 | B2 | 3/2019 | Elangovan et al. |
| 10,290,067 | B1* | 5/2019 | Cronin ................... G06Q 50/12 |
| 10,328,898 | B2 | 6/2019 | Golsch et al. |
| 10,328,899 | B2 | 6/2019 | Golsch |
| 10,328,900 | B1 | 6/2019 | Yakovenko et al. |
| 10,445,842 | B1* | 10/2019 | Thompson ........... H04W 4/029 |
| 10,540,135 | B1* | 1/2020 | Fitzgerald ............... G06F 3/044 |
| 10,891,562 | B1* | 1/2021 | Gerace ..................... G07C 9/27 |
| 11,037,184 | B2* | 6/2021 | Li ....................... G06Q 30/0239 |
| 2003/0065805 | A1* | 4/2003 | Barnes, Jr. ........ G06Q 30/0643 709/244 |
| 2003/0172375 | A1* | 9/2003 | Shaw ..................... H04L 67/04 725/50 |
| 2005/0198318 | A1* | 9/2005 | von Mueller ...... G06Q 20/3567 709/228 |
| 2011/0040655 | A1* | 2/2011 | Hendrickson ........... H04L 67/52 705/26.1 |
| 2011/0093302 | A1* | 4/2011 | Hernandez ............. G06Q 50/12 705/26.1 |
| 2011/0173041 | A1* | 7/2011 | Breitenbach ........... B67D 7/348 705/26.1 |
| 2011/0215921 | A1 | 9/2011 | Ben Ayed et al. |
| 2012/0045058 | A1 | 2/2012 | Weghaus |
| 2014/0046802 | A1* | 2/2014 | Hosein ............... G01R 1/06711 705/26.61 |
| 2014/0058902 | A1* | 2/2014 | Taylor ................... G06Q 30/06 705/26.81 |
| 2014/0274013 | A1 | 9/2014 | Santavicca |
| 2015/0148989 | A1 | 5/2015 | Cooper et al. |
| 2015/0161832 | A1 | 6/2015 | Esselink et al. |
| 2015/0310681 | A1 | 10/2015 | Avery et al. |
| 2015/0356797 | A1 | 12/2015 | McBride et al. |
| 2016/0012515 | A1* | 1/2016 | Cronin ............... G06Q 30/0635 705/26.81 |
| 2016/0110781 | A1* | 4/2016 | Bedel ..................... H04W 4/02 705/26.1 |
| 2016/0150407 | A1 | 5/2016 | Michaud et al. |
| 2016/0155108 | A1* | 6/2016 | McLaughlin ........ G06Q 20/325 705/21 |
| 2016/0244311 | A1* | 8/2016 | Burks .................. B67D 1/0888 |
| 2017/0006434 | A1* | 1/2017 | Howe ................ G06Q 20/3224 |
| 2017/0062938 | A1 | 3/2017 | Cheng et al. |
| 2017/0104589 | A1 | 4/2017 | Lambert et al. |
| 2017/0124578 | A1* | 5/2017 | Bennett ............... G06Q 20/3224 |
| 2017/0132533 | A1 | 5/2017 | Darnell et al. |
| 2017/0230801 | A1* | 8/2017 | Amsalem .................. G01S 5/02 |
| 2017/0309098 | A1 | 10/2017 | Watters et al. |
| 2017/0330402 | A1 | 11/2017 | Menard et al. |
| 2018/0029560 | A1 | 2/2018 | Mohaupt et al. |
| 2018/0046997 | A1* | 2/2018 | Zheng .................. G06Q 20/102 |
| 2018/0053423 | A1* | 2/2018 | DaCosta ............. G01C 21/3438 |
| 2018/0082250 | A1* | 3/2018 | Cho .................. G06Q 10/0835 |
| 2018/0099643 | A1 | 4/2018 | Golsch et al. |
| 2018/0103414 | A1 | 4/2018 | Golsch |
| 2018/0109921 | A1* | 4/2018 | Cerchio .................. H04W 4/02 |
| 2018/0126952 | A1 | 5/2018 | Niemiec |
| 2018/0130118 | A1* | 5/2018 | Guran ................ G06Q 20/4014 |
| 2018/0154865 | A1 | 6/2018 | Bianchi, III et al. |
| 2018/0240206 | A1* | 8/2018 | Hawley .................. G06Q 50/12 |
| 2018/0247476 | A1* | 8/2018 | Kusens ................. H04W 64/00 |
| 2018/0269565 | A1 | 9/2018 | Guthrie et al. |
| 2018/0322870 | A1* | 11/2018 | Lee ..................... H04N 21/4394 |
| 2019/0205936 | A1* | 7/2019 | Lal ......................... H04W 4/021 |
| 2019/0378080 | A1* | 12/2019 | Srinivasan ......... G06Q 20/3224 |
| 2019/0378081 | A1* | 12/2019 | Swartz .................... G06Q 50/26 |
| 2020/0118071 | A1* | 4/2020 | Venkatesan ........ G06Q 10/0833 |
| 2020/0186966 | A1* | 6/2020 | Mycek .................. H04W 4/027 |
| 2020/0259570 | A1* | 8/2020 | Mak ........................ H04B 17/10 |
| 2021/0011111 | A1* | 1/2021 | Li ......................... G01S 5/0252 |
| 2021/0065259 | A1* | 3/2021 | Luong ................... G06Q 30/016 |
| 2021/0133665 | A1* | 5/2021 | Hsiao ................... G06Q 10/103 |
| 2021/0300297 | A1* | 9/2021 | Kursar .................. B60R 25/403 |

FOREIGN PATENT DOCUMENTS

| | | |
|---|---|---|
| WO | WO-16156682 A1 | 10/2016 |
| WO | WO-2017181050 A1 | 10/2017 |
| WO | WO-18040641 A1 | 3/2018 |

OTHER PUBLICATIONS

Stadium of the Future—The Next Generation of Game Day Technology Oracle, 2019 (Year: 2019).*
How Platforms Can Crowdsource Deliveries for Small Communities PYMNTS.com, Mar. 27, 2018 (Year: 2018).*
SeatServe.com Web Pages—In-Seat Delivery. Done Right Sear Serve, Aug. 2019 (Year: 2019).*
Kolodny, Lora, JoyRun, a food delivery app with a twist raises $8.5 million TechCrunch.com, Mar. 30, 2017 (Year: 2017).*
Mann, Sonya, The New Food Delivery App Might Actually Be Able to Make Money Inc., Mar. 30, 2017 (Year: 2017).*
Donavan, Jay, How the 49ers Are Using Indoor Beacons to Help You Find Hot Dogs and Beer TechCrunch.com, Nov. 4, 2014 (Year: 2014).*
Cavazzana, Marco, Design Apps with Indoor Location Awareness the Right Way JayWay.com, Nov. 16, 2016 (Year: 2016).*

* cited by examiner

SYSTEM AND METHOD FOR CROWDSOURCED IN-SEAT DELIVERY OF STADIUM CONCESSIONS

FIELD

The present disclosure relates to mobile devices, such as mobile devices configured to interact with vehicles and ordering systems of properties.

BACKGROUND

This section provides background information related to the present disclosure which is not necessarily prior art.

Passive entry/passive start (PEPS) systems allow a vehicle to locate a key associated with the vehicle, such as a wireless key fob carried by a user of the vehicle. PEPS systems can allow anyone in possession of a key fob that has been previously paired with a vehicle's central PEPS electronic control module (ECM) to access the vehicle by grabbing a door handle and to start the vehicle with a push of a button.

The central PEPS ECM authenticates the key fob to determine if the key fob is authorized to access the vehicle (e.g., previously paired with the central PEPs ECM). The central PEPS ECM uses a signal strength determined using a plurality of vehicle antennas to estimate a location of the key fob. If the key fob can be authenticated and is located within a predetermined area, the vehicle's function is made available to the user, such as the vehicle doors are unlocked and/or the vehicle is started.

Crowdsourcing may be used in various situations. For example, crowdsourcing may be used to fund and grow businesses.

SUMMARY

This section provides a general summary of the disclosure, and is not a comprehensive disclosure of its full scope or all of its features.

In a feature, an ordering management system for a property includes: a location module configured to determine locations of mobile devices that are located within boundaries of the property; a selection module configured to, in response to receipt of an order from a first mobile device for delivery of one or more items to a location of the first mobile device within the boundaries of the property: select one vendor of a plurality of vendors at the property to supply the one or more items of the order; determine a group of the mobile devices based on the location of the first mobile device; and select a second mobile device from the group based on the location of the second mobile device and a location of the selected one vendor; a device communication module configured to selectively transmit, to the second mobile device, the location of the selected one vendor for pickup of the order and the location of the first mobile device for delivery of the order; and a vendor communication module configured to selectively transmit the order including the one or more items to the selected one vendor.

In further features, the selection module is configured to select the second mobile device from the group based on the location of the second mobile device being closer to the location of the selected one vendor than the locations of the other mobile devices of the group.

In further features, the location of the first mobile device includes a section, a row, and a seat number.

In further features, the selection module is configured to select the group based on the mobile devices of the group being associated in memory with the section of the first mobile device.

In further features, the selection module is configured to select the group based on the mobile devices of the group being associated in memory with sections that are within one section of the section of the first mobile device.

In further features, the vendor selection module is configured to select the one vendor of the plurality of vendors at the property to supply the one or more items of the order based on the location of the first mobile device.

In further features, the vendor selection module is configured to select the one vendor of the plurality of vendors based on a location of the selected one vendor being closer to the location of the first mobile device than other locations of other ones of the plurality of vendors.

In further features, the one or more items include at least one of a food item and a beverage item.

In further features, the one or more items include at least one merchandise item.

In further features, location modules are located throughout the property and configured to, every predetermined period, transmit a predetermined signal and a unique identifier, where the mobile devices are configured to determine signal strength indicators based on ones of the predetermined signals received from ones of the location modules, respectively, and to transmit the signal strength indicators and the unique identifiers of the ones of the location modules, respectively, to the location determination module, and where the location determination module is configured to determine a location of one of the mobile devices within the boundaries of the property based on the signal strength indicators and the unique identifiers of the ones of the location modules.

In further features, the location determination module is configured to: determine locations of the ones of the location modules within the boundaries of the property based on the unique identifiers of the ones of the location modules, respectively, and determine the location of the one of the mobile devices based on the signal strength indicators and the locations of the ones of the location modules, respectively.

In further features, the location modules are located throughout the property such that the predetermined signals are received from at least two of the location modules everywhere within the boundaries of the property.

In further features, the location modules are located throughout the property such that the predetermined signals are received from at least three of the location modules everywhere within the boundaries of the property.

In further features, the selection module is configured to receive the location of the first mobile device with the order.

In further features, the location module is configured to determine the location of the first mobile device.

In further features, location modules are located throughout the property and configured to, every predetermined period, transmit a predetermined signal and a unique identifier, where the first mobile device is configured to determine signal strength indicators based on ones of the predetermined signals received from ones of the location modules, respectively, and to transmit the signal strength indicators and the unique identifiers of the ones of the location modules, respectively, to the location determination module, and where the location determination module is configured to determine the location of the first mobile device based on the signal strength indicators and the unique identifiers of the ones of the location modules.

In further features, the device communication module is configured to transmit the location of the selected one vendor and the location of the first mobile device in response to receipt of a confirmation of an intent to deliver the order to the location of the first mobile device.

In further features, the second mobile device is configured to transmit the confirmation of the intent to deliver the order to the location of the first mobile device in response to receipt of user input to the second mobile device.

In further features, a vehicle system includes: the ordering management system; and a vehicle configured to: wirelessly connect to the first mobile device; and selectively at least one of: unlock one or more doors of the vehicle; and start the vehicle, where the location of the first mobile device is the location of the vehicle.

In a feature, an ordering management method for a property includes: determining locations of mobile devices that are located within boundaries of the property; in response to receipt of an order from a first mobile device for delivery of one or more items to a location of the first mobile device within the boundaries of the property: selecting one vendor of a plurality of vendors at the property to supply the one or more items of the order; determining a group of the mobile devices based on the location of the first mobile device; and selecting a second mobile device from the group based on the location of the second mobile device and a location of the selected one vendor; selectively transmitting, to the second mobile device, the location of the selected one vendor for pickup of the order and the location of the first mobile device for delivery of the order; and selectively transmitting the order including the one or more items to the selected one vendor.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Mobile devices can be used to perform various functions, such as perform internet searches, check email, send messages, etc. Examples of mobile devices include, but are not limited to, such as (smart) cellular phones and tablet devices.

Mobile devices can also be used to perform other functions, such as to order delivery of food, beverages (e.g., alcoholic, non-alcoholic, etc.), and/or other items (e.g., merchandise, etc.). For example, via a mobile device, a user can place an order for delivery by a vendor to the user. The user can order delivery of the order, for example, to a home of the user from a vendor located outside of the home or to a specific seat of the user within a property (e.g., a stadium, venue, etc.) that the vendor is also located within.

The present application involves monitoring locations of mobile devices on a property. A first user of a mobile device that is located near a vendor can be used to transport an order from the vendor to the seat of a second user that placed the order. The first user may be a non-employee of the property. For example, the first and second users may be attendees (e.g., ticketed) of an event. By way of the above, delivery of orders to users (e.g., at their seats) can be crowdsourced by users that have already left their seats such that users don't have to leave their seats just to place, pick up, or wait for orders at vendors. The deliverers of orders can be compensated monetarily, such as by the users that placed the orders, the vendor, the property, etc.

Figure 1:
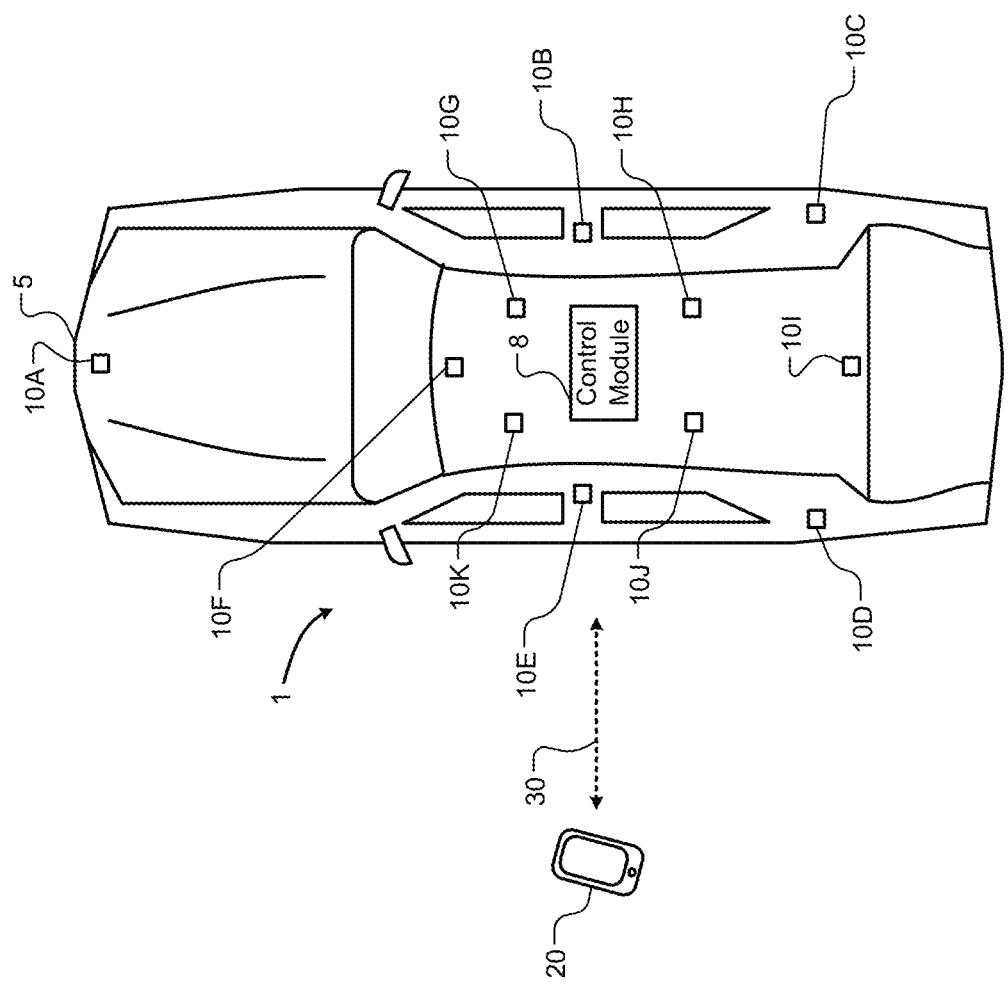
FIG. 1 is a functional block diagram of a subject vehicle with a localization system.
Figure 2:
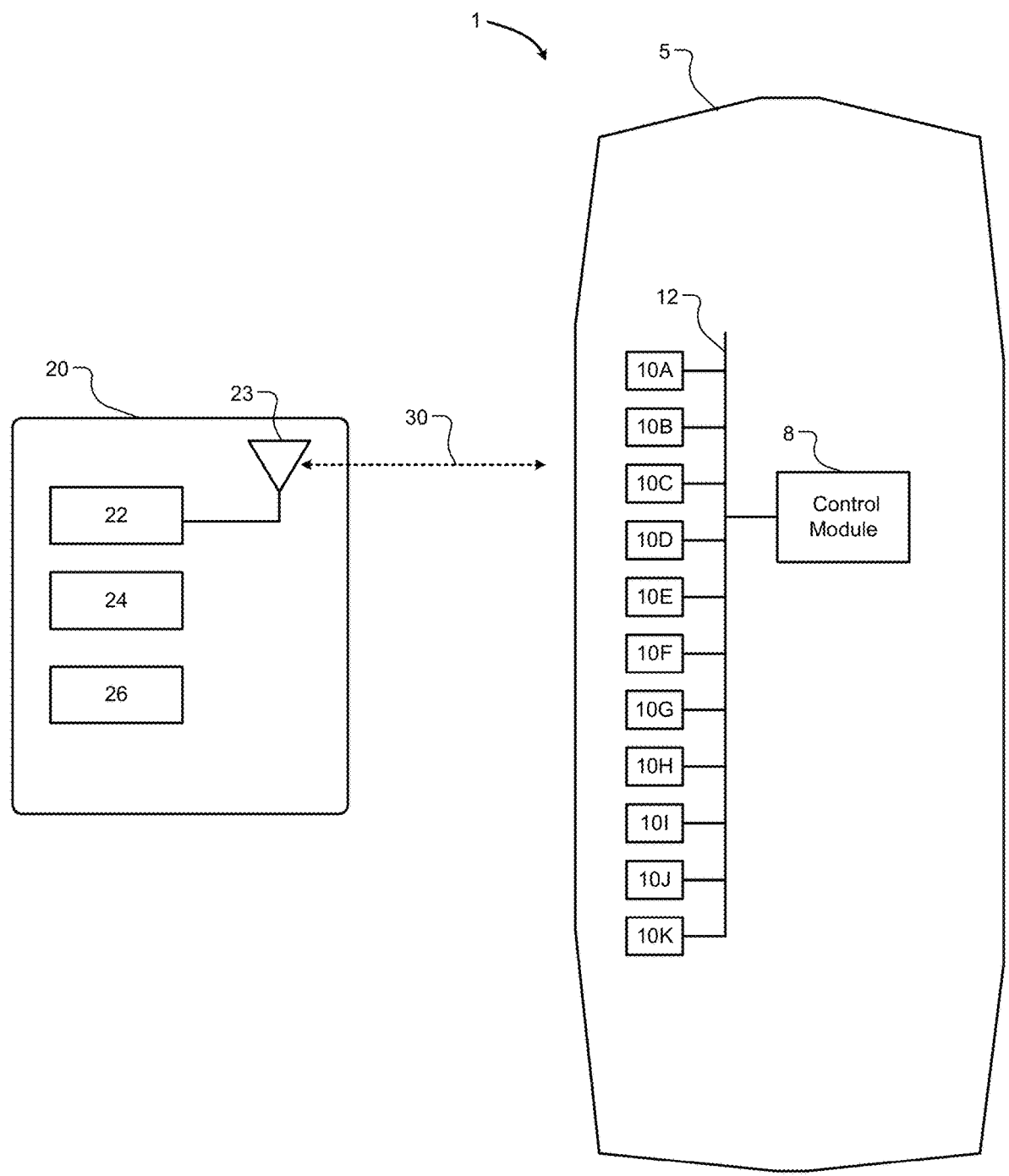
FIG. 2 is a functional block diagram including example components of a portable device.

With reference to FIGS. 1 and 2, a localization system 1 is provided within a vehicle 5 and includes a control module 8 (also referred to as a central communication module) and a plurality of sensors 10A to 10K (collectively referred to as sensors 10). The sensors 10 can include a number of sensors that are mounted on or to the exterior of the vehicle 5, such as exterior body or trim components of the vehicle 5. In the example of FIG. 1, sensors 10A to 10E are shown as exterior sensors. The sensors 10 can additionally or alternatively include a number of sensors that are mounted on or to the interior of the vehicle 5, such as interior trim components of the vehicle 5. In the example of FIG. 1, sensors 10F to 10K are shown as interior sensors. For example only, the sensors 10 may include antennas or antenna modules.

The control module 8 can be implemented, for example, as a PEPS electronic control module (ECM) and is described in further detail below. The control module 8 can communicate with the sensors 10 using a wired vehicle interface 12, such as in the example of FIG. 2. The vehicle interface 12, for example, can include a controller area network (CAN) bus and/or a lower data rate communication bus, such as a local interconnect network (LIN) bus. The vehicle interface 12 can also include a clock extension peripheral interface (CXPI) bus. Additionally or alternatively, the vehicle interface 12 can include a combination of CAN bus, LIN bus, and CXPI bus communication interfaces. Additionally or alternatively, the control module 8 can communicate with the sensors 10 using wireless communication.

The control module 8 is configured to establish a secure communication connection, such as a Bluetooth low energy (BLE) communication connection, for example, with a portable device 20. As noted above, the control module 8 communicates information about the secure communication connection to the sensors 10 via the vehicle interface 12, such as the timing of the next communication connection event, the timing interval between communication connection events, the communication channel for the next communication connection event, a channel map, a channel hop interval or offset to calculate the channel for subsequent communication connection events, communication latency information, and/or communication jitter information, etc.

The sensors 10 can then follow the secure communication connection between the control module 8 and the portable device 20 and receive communication packets sent by the portable device 20 to the control module 8. The sensors 10 can then measure signal information about the signals received from the portable device, such as relative signal strength (RSSI), angle of arrival, time of arrival, time difference of arrival, etc., and communicate the signal information to the control module 8 via communication over the vehicle interface 12.

With particular reference to FIG. 2, the portable device 20 can include one or more communication chipsets, such as communication chipset 22. For example, the portable device 20 may include one or more of a BLE chipset, a WiFi chipset, a WiFi direct chipset, and one or more other types of chipsets connected to one or more antennas, such as antenna 23. The portable device 20 can also include application software stored in memory 24. The portable device 20 can also optionally include a global positioning system (GPS) module 26 or another suitable type of location device. The portable device 20 sends and receives communication signals 30 to and from the control module 8. As discussed above, the sensors 10 can listen for the communication signals 30 based on the information about the secure communication connection received from the control module 8. As such, the sensors 10 also receive the communication signals 30 sent by the portable device 20 to the control module 8. The portable device 20 can also be referred to as a mobile device.

Examples of the portable device 20 include cellular (smart) phones, tablet devices, and other types of devices with re-chargeable internal batteries that allow for device operation without the device being connected to power. In addition to being used to interact with the vehicle 10, the portable device 20 can also be used to perform one or more other operations/functions. Additionally, the portable device 20 can place orders with various different types of vendors. For example, the portable device 20 can be used to place orders for food, beverages, merchandise, etc. for delivery with vendors.

Orders for delivery of items (e.g., food, beverages, merchandise, etc.) from vendors of a property (e.g., a stadium, concert venue, etc.) may be placed via an application 210 executed by the portable device 20. The application 210 may also be executed on portable devices at the property to arrange for delivery of orders from the vendors to other orderers at the property, as discussed further below.

Figure 3:
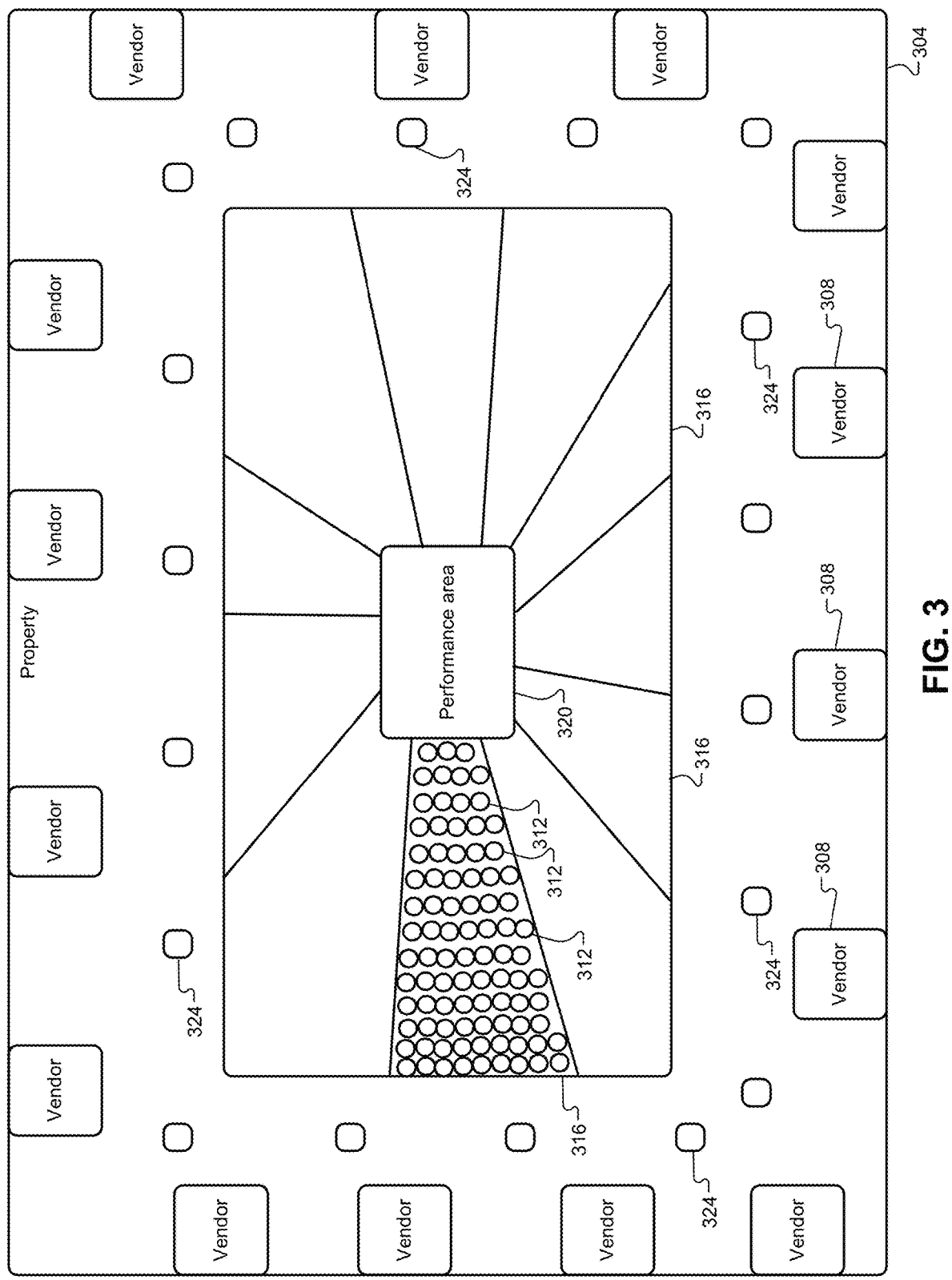
FIG. 3 is a top view of an example property.

FIG. 3 is a top view of an example property 304, such as a stadium, an event center, a concert venue, etc. One or more vendors 308 are located at the property 304. The vendors 308 sell items, such as food items, beverage items, merchandise items (e.g., clothing, keychains, bumper stickers, etc.), and other types of concession items.

The property 304 also includes a plurality of seats 312. The seats 312 may be arranged in more than one section 316 in various properties. While seats are only shown in one section for simplicity, each section may include seats. The seats 312 may be numbered and may be arranged in rows. As such, each of the seats 312 may have a unique section, row, and seat number. The section, row, and seat number of an attendee may be specified on a ticket of the attendee. The ticket may be printed or electronic. Electronic tickets may be stored by portable devices.

The property 304 may include a performance area 320, such as a field for playing one or more sports, a place for one or more stages, etc. An event which attendees may travel to the property 304 to experience (and for which the ticket may be issued) may be performed on the performance area 320. While an example property arrangement of seats, sections, vendors, and performance area are provided, the present application is also applicable to other property arrangements.

A plurality of location modules 324 are located throughout the property 304. The location modules 324 may be, for example, Bluetooth low energy (BLE) beacon modules or another suitable type of transceiver. WiFi and ZigBee are examples of other types of transceivers. The location modules 324 are used to determine locations of portable devices within the property 304. The location modules 324 may also be used to communicate other data and/or with devices.

Figure 4:
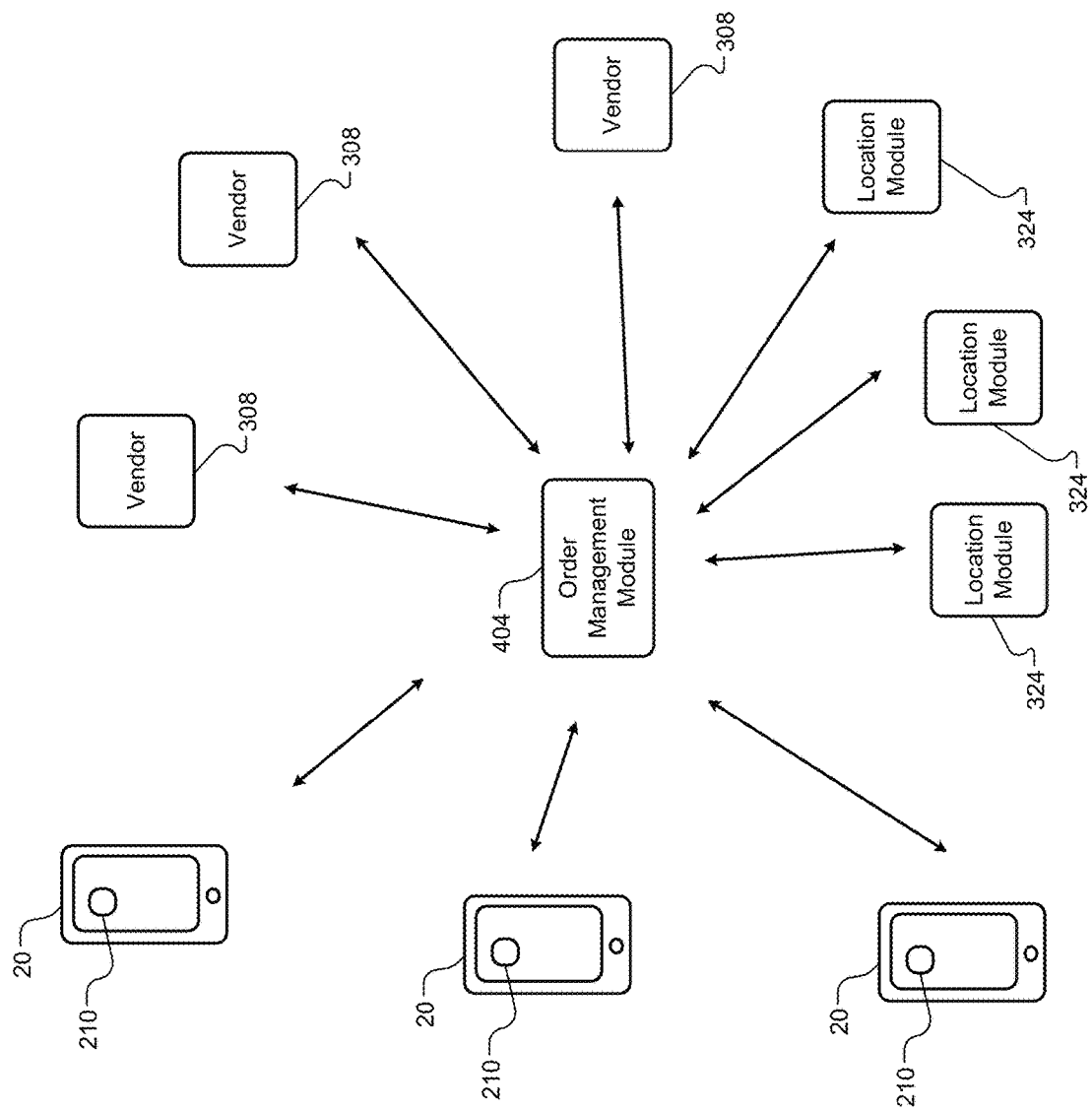
FIGS. 4-6 are functional block diagrams of an example order management system of a property.

FIG. 4 is a functional block diagram of an example order management system of the property 304. An order management module 404 communicates with portable devices 20 at the property 304, vendors 308 at the property 304, and location modules 324 at the property 304. The order management module 404 may communicate with the portable devices 20, the vendors 308, and the location modules 324 via a wireless network, a wired network, or a combination of wireless and wired networks. The order management module 404 may communicate with the portable devices 20, the vendors 308, and the location modules 324 via the same or different networks.

For example, the order management module 404 may receive orders from portable devices 20. The order management module 404 may transmit orders to ones of the vendors 308. The order management module 404 may transmit information to other portable devices 20 at the property 304 to arrange for delivery of the orders from vendors to associated users. The order management module 404 may receive data from the portable devices 20 and/or the location modules 324 to determine locations of portable devices 20 at the property 304.

Figure 5:
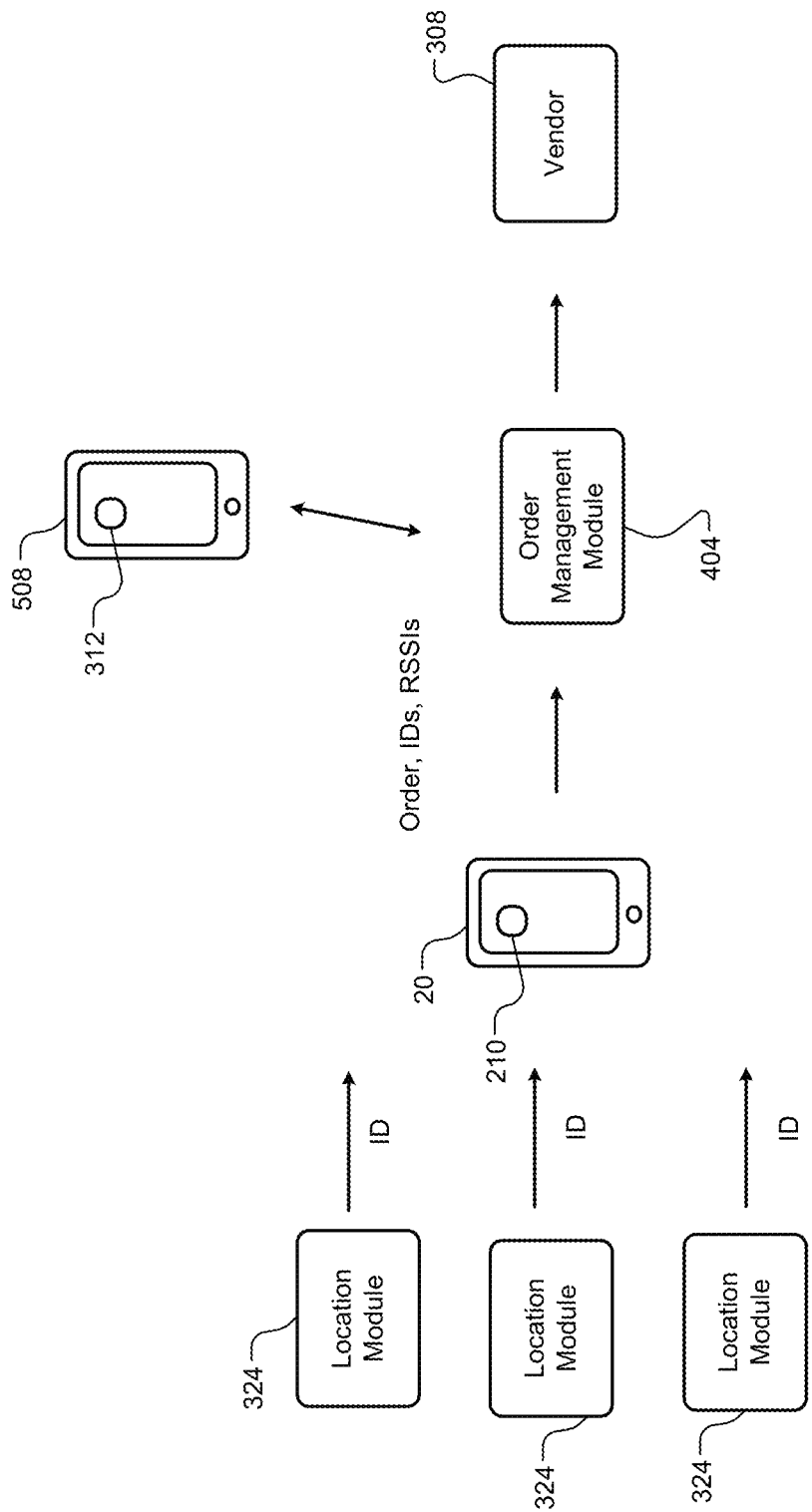

FIG. 5 is a functional block diagram of a portion of the example order management system of the property 304 of FIG. 4. The location modules 324 may transmit (e.g., broadcast) a predetermined signal having predetermined characteristics periodically (e.g., twice per second or at another suitable frequency). Each of the location modules 324 may also transmit a unique identifier (ID) of that location module 324 with the predetermined signal.

The portable device 20 determines the RSSI based on one or more characteristics (e.g., magnitude) of the predetermined signal received from a location module 324. The RSSI corresponds to a radial distance of the portable device 20 from that location module 324. For example, the RSSI may decrease as the distance between the portable device 20 and the location module 324 increases, and vice versa. The RSSIs determined based on the predetermined signals received from multiple location modules 324 and the locations of those location modules 324 may be used by the order management module 404 to determine a location of the portable device 20. The location modules 324 may be located throughout the property 304 such that any portable device that is within boundaries of the property 304 will receive the predetermined signals from at least two, three, or more than three different location modules. This may allow for triangulation of the location of all portable devices that are within the boundaries of the property 304.

Figure 6:
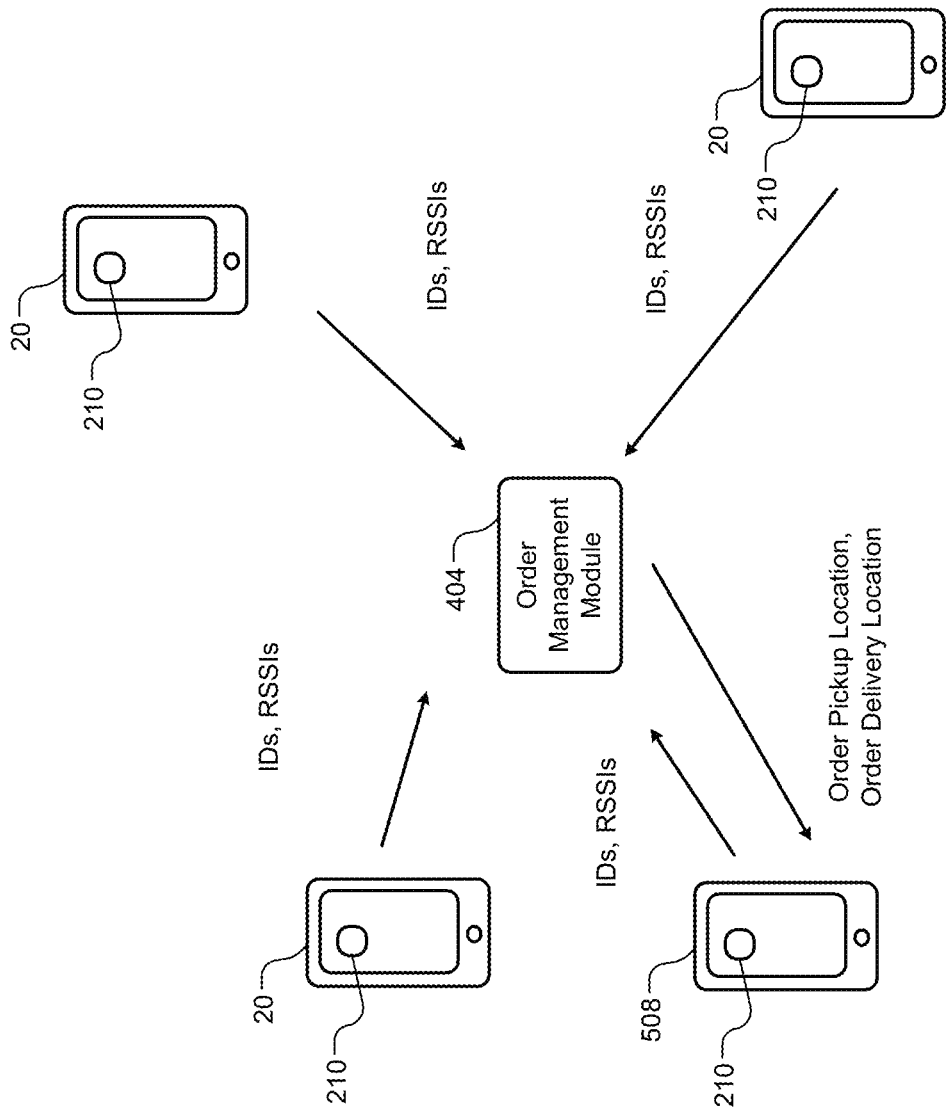
Figure 7:
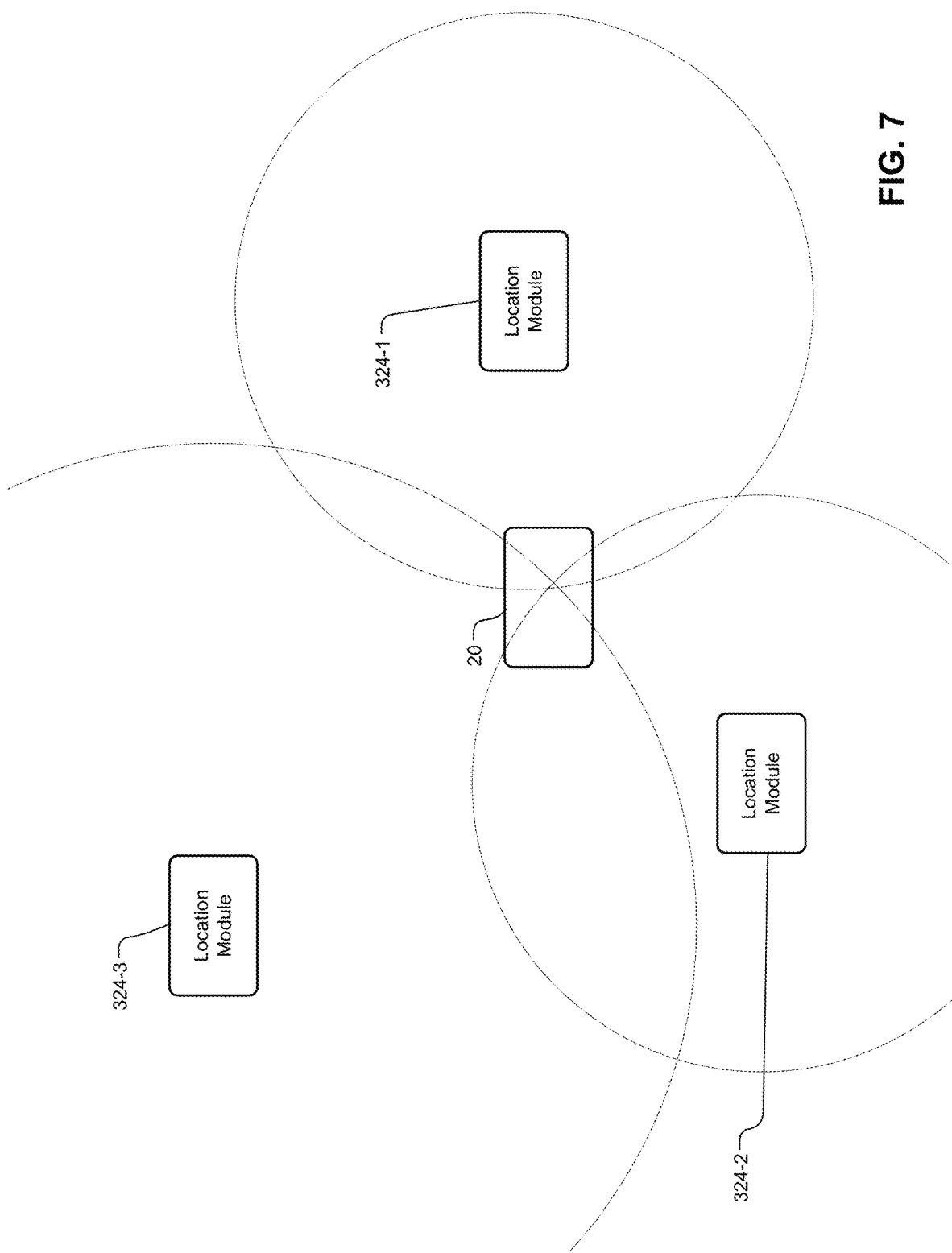
FIG. 7 is an example block diagram including location modules and a portable device.

As shown in FIG. 6, portable devices 20 (e.g., executing the application 210) may transmit the IDs of the location modules 324 from which the predetermined signals were received within the last predetermined period and the RSSIs determined based on those predetermined signals to the order management module 404. FIG. 7 is an example block diagram including location modules 324-1, 324-2, 324-3, and a portable device 20. Based on the RSSI determined based on the predetermined signal received from the location module 324-1, the order management module 404 may determine that the portable device 20 is a first distance (corresponding to a first radius of a circle) from the location module 324-1. Based on the RSSI determined based on the predetermined signal received from the location module 324-2, the order management module 404 may determine that the portable device 20 is a second distance (corresponding to a second radius of a circle) from the location module 324-2. Based on the RSSI determined based on the predetermined signal received from the location module 324-3, the order management module 404 may determine that the portable device 20 is a third distance (corresponding to a third radius of a circle) from the location module 324-3. The location where the circles intersect is approximately the location of the portable device 20.

Referring back to FIG. 5, the portable device 20 may transmit an order for delivery of one or more items from a vendor to a user of the portable device 20 (e.g., the seat of the user) along with the IDs (of the location modules 324) and the RSSIs to the order management module 404. The order management module 404 may determine the location of the portable device 20 based on the locations of the location modules 324 and the associated RSSIs, such as discussed above. Alternatively, the order management module 404 may determine the location of the portable device 20 by reading the seat number, row, and section from an electronic event ticket stored on the portable device 20 and transmitted with the order. The electronic event ticket (e.g., an optical identifier on the ticket) may be required to gain entry to the property 304 in various implementations. Alternatively, the seat number, row, and section may transmitted by the portable device 20 with the order. In various implementations, the location of the portable device 20 may be the location of a vehicle parked at the property 304. This may allow for delivery of items directly to the vehicle.

Based on the item(s) in the order and the location of the portable device 20, the order management module 404 selects a vendor 308 to provide the item(s) in the order. Based on the selected vendor 308, the order management module 404 selects another one of the portable devices (508 in FIG. 5) to possibly deliver the item(s) ordered to the location of the portable device 20 that placed the order. For example, the order management module 404 may identify a group of portable devices that with seats within the same section as or within one section of the portable device 20 that transmitted the order. Within one section may be +/−1 section (e.g., section 119+/−1=section 118, section 119, or section 120) of the section of the portable device 20 or determined in another suitable manner. As another example, the order management module 404 may identify a group of portable devices that are within a first predetermined distance of the selected vendor and that have seats within a second predetermined distance of the seat of the user of the portable device 20. The order management module 404 may select the one of portable devices of the group that is closest to the selected vendor.

The order management module 404 transmits a request to deliver the order to the location of the portable device 20 to the selected portable device. If the selected portable device transmits back a denial or does not transmit a confirmation within a predetermined period, the order management module 404 may select another one of portable devices of the group (e.g., the next closest to the selected vendor) and transmit a request to deliver the order to the location of the portable device 20 to another. The selected portable device may transmit the confirmation in response to receipt of user input to the selected portable device, such as touching of a touchscreen display of the selected portable device.

As shown in FIG. 6, in response to receipt of a confirmation of the request to deliver the order to the portable device 20, the order management module 404 transmits the order pickup location (e.g., the name of the selected vendor) and the order delivery location (the location of the portable device 20 that placed the order) to the confirming portable device 508.

Figure 8:
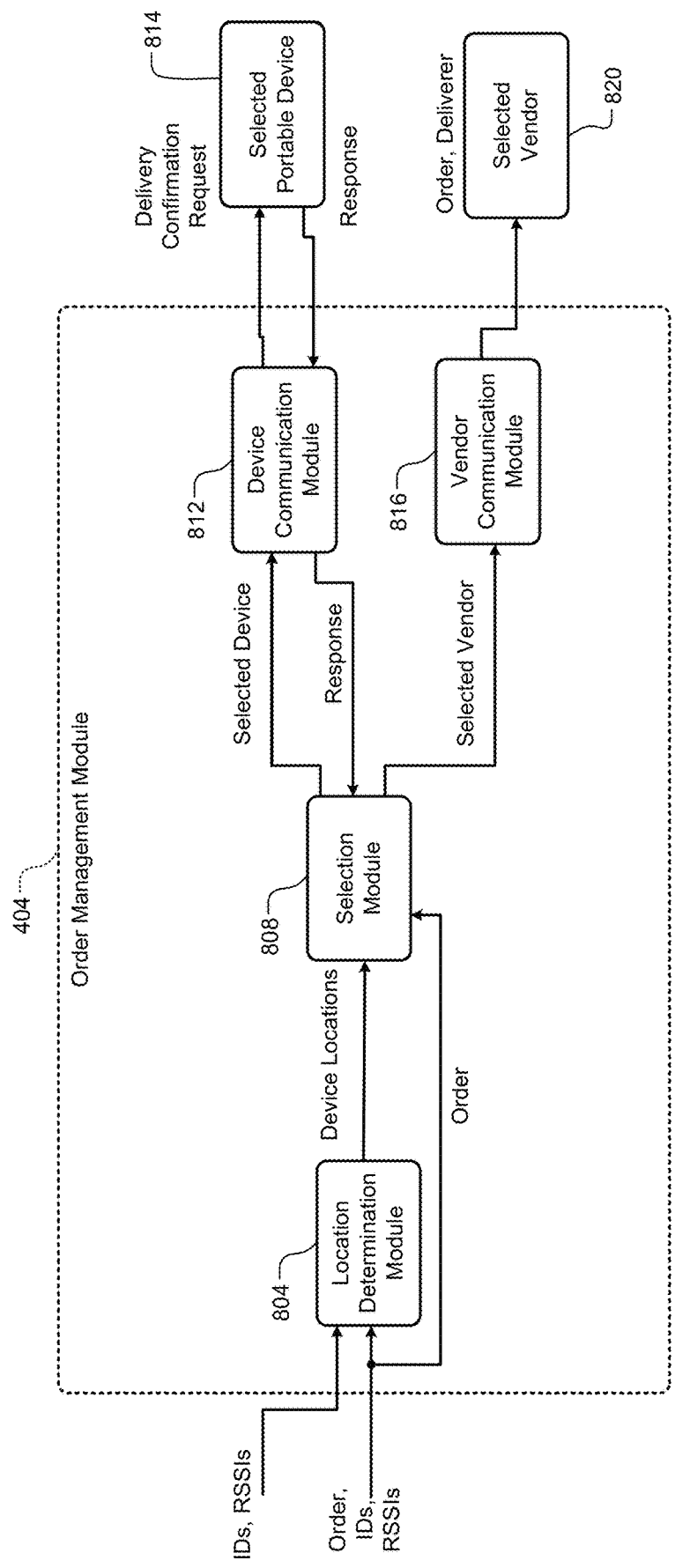
FIG. 8 is a functional block diagram of an example implementation of an order management module.

FIG. 8 is a functional of the example implementation of the order management module 404. A location determination module 804 determines the locations of the portable devices 20 on the property 304 based on the RSSIs, the IDs of the associated location modules, and the locations of those location modules. The location determination module 804 may determine the locations of portable devices, for example, as discussed above. While the example of determining locations based on RSSIs is provided, another suitable type of signal strength indicator may be used to determine the locations of the portable devices on the property 304.

A selection module 808 receives an order from a portable device 20. The order includes one or more items (e.g., food, beverages, merchandise, etc.) to be delivered from a vendor to a location of the portable device 20. The location where the order is to be delivered may be included with the order, determined by the location determination module 804, or determined the selection module 808 based on the order (e.g., a section, row, and seat number associated with the portable device 20) or an electronic ticket sent along with the order.

The selection module 808 selects a vendor 308 to fulfill the order based on the items included in the order. For example, the selection module 808 may select one of the vendors that sells all of the items (and has all of the items in stock). The order management module 404 may include a database that includes a list of items sold by each vendor. The order management module 404 may also include a database that includes a list of items in stock for each vendor. The items that are in stock for each vendor may be updated as items are sold by a vendor and/or delivered to a vendor. If multiple vendors sell all of the items of the order (and have all of the items in stock), the selection module 808 may select a closest one (e.g., walking distance wise, such as via a concourse) of the multiple venders to the section where the order is to be delivered.

The selection module 808 selects another portable device at the property 304 based on the location where the order is to be delivered and the location of the selected vendor 308. For example, the selection module 808 may identify a group of portable devices that are not at seats (e.g., sections, rows, and seat numbers) associated with those portable devices and that are within a predetermined distance (e.g., the same section or within 1 section of the section where the order is to be delivered). The selection module 808 may limit the group to only portable devices that are within a predetermined distance (e.g., 1000 feet or another suitable distance) of the selected vendor. The selection module 808 selects one of the portable devices of the group. For example, the selection module 808 may select the one of the portable devices of the group that is closest to the selected vendor.

A device communication module 812 transmits a request to the selected portable device 814 for a confirmation that a user of the selected portable device will deliver the order to the location of the portable device (e.g., the section, row, and seat number) that placed the order. If a response is received from the selected portable device declining the opportunity to deliver the order or no response is received for a predetermined period (e.g., 30 seconds or another suitable period), the selection module 808 may select another portable device and transmit a request to the other selected portable device.

When a confirmation to deliver the order to the location of the portable device that placed the order is received from a selected portable device, a vendor communication module 816 transmits the order to the selected vendor 820 for preparation, assembly, bagging/traying the ordered item(s), etc. The order management module 404 may also secure payment for the order from, for example, an account (e.g., a credit card number) associated with the portable device that placed the order. The selected vendor 820 prepares the order for pickup by a user of the selected portable device 814. The vendor communication module 816 may also transmit a unique identifier of the user of the selected portable device 814 or of the selected portable device 814 itself. This unique identifier may be used to verify identify at order pickup.

In various implementations, the device communication module 812 may transmit a unique identifier (e.g., an optically scanable code) to the selected portable device 814 after a confirmation to deliver the order is received from the selected portable device 814. The selected vendor 820 may release the order for delivery to the location of the portable device that placed the order after verifying the unique identifier (e.g., scanning the optically scanable code).

Figure 9:
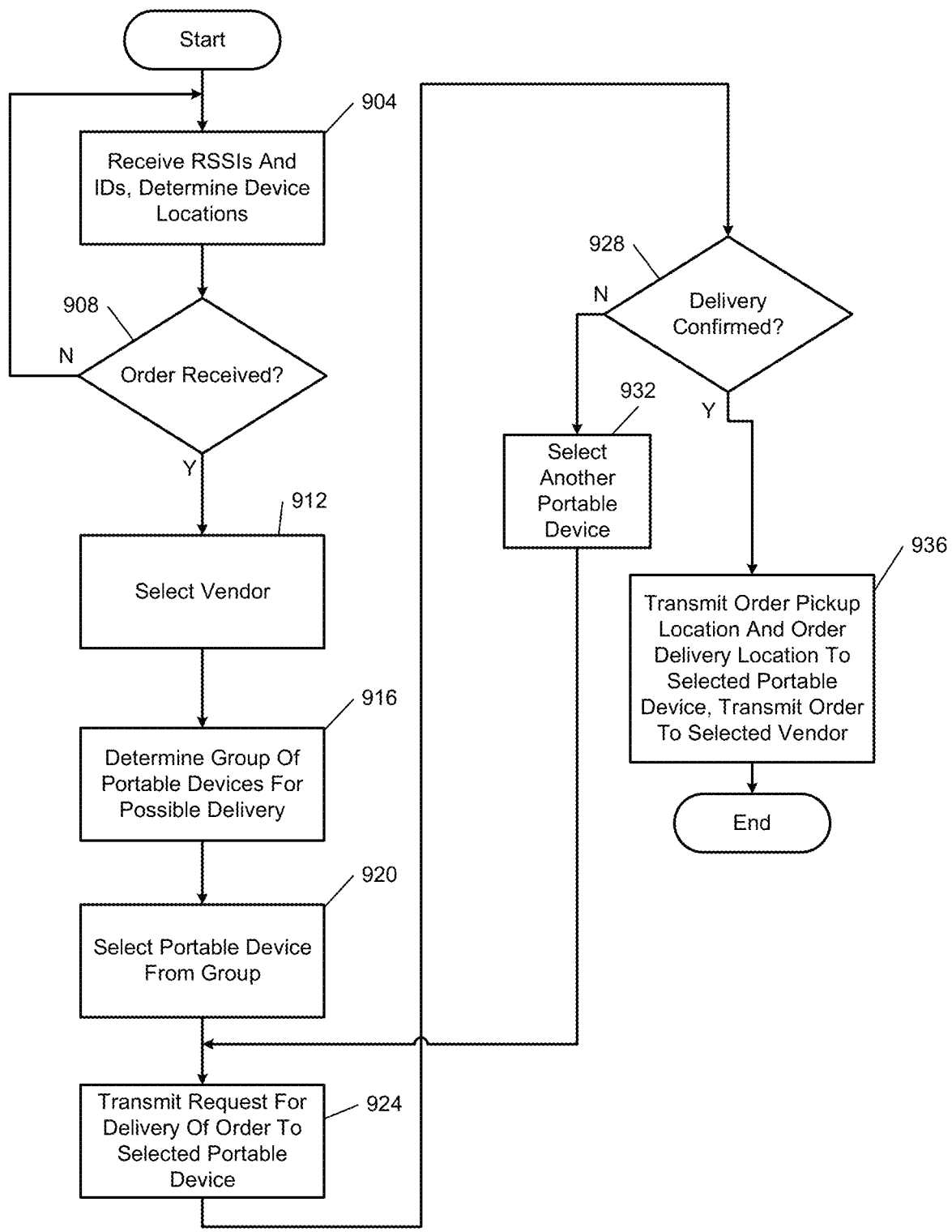
FIG. 9 is a flowchart depicting an example method of receiving an order from a portable device and arranging for delivery of the order to the portable device from a vendor by another portable device.

FIG. 9 is a flowchart depicting an example method of receiving an order from a portable device and arranging for delivery of the order to the portable device from a vendor by another portable device. Control begins with 904 where the location determination module 804 determines the locations of portable devices at the property 304 based on the RSSIs and IDs of the location modules, respectively, such as discussed above. At 908, the selection module 808 determines whether an order has been received from a portable device. If 908 is true, control continues with 912. If 908 is false, control may return to 904. In this manner, portable device locations may be updated in real time.

At 912, the selection module 808 selects a vendor to fulfil the order. For example, the selection module 808 may select a vendor that sells all of the items of the order and that has all of the items of the order in stock. If multiple vendors have all of the items in stock, the selection module 808 may select the one of the multiple vendors that is located closest to the section of the portable device that transmitted the order.

At 916, the selection module 808 selects a group of portable device, as described above. For example, the selection module 808 may select the portable devices having seats in the same section as the portable device from which the order was received. The selection module 808 may also limit the group to portable devices that are not present at their seats (or within a predetermined distance of their seats) and/or portable devices that are within a predetermined distance of the selected vendor.

At 920, the selection module 808 selects one of the portable devices of the group. For example, the selection module 808 may select the one of the portable devices of the group that is closest to the selected vendor. At 924, the device communication module 812 transmits the request for delivery of the order to the selected portable device via a network.

At 928, the selection module 928 determines whether a response has been received from the selected portable device confirming that the user of the selected portable device will deliver the order to the location of the portable device from which the order was received. If 928 is false, the selection module 808 selects another one of the portable devices of the group at 932, and control transfers to 924. In various implementations, the selection module 808 may update the group before selecting another one of the portable devices. If 928 is true, control continues with 936. At 936, in response to receipt of a confirmation from the selected portable device, the device communication module 812 transmits the order pickup location and the order delivery location to the selected portable device. The vendor communication module 816 transmits the order to the selected vendor at 816 for preparation of the order.

In a feature, an ordering management system for a property includes: a location module configured to determine locations of mobile devices that are located within boundaries of the property; a selection module configured to, in response to receipt of an order from a first mobile device for delivery of one or more items to a location of the first mobile device within the boundaries of the property: select one vendor of a plurality of vendors at the property to supply the one or more items of the order; determine a group of the mobile devices based on the location of the first mobile device; and select a second mobile device from the group based on the location of the second mobile device and a location of the selected one vendor; a device communication module configured to selectively transmit, to the second mobile device, the location of the selected one vendor for pickup of the order and the location of the first mobile device for delivery of the order; and a vendor communication module configured to selectively transmit the order including the one or more items to the selected one vendor.

In further features, the selection module is configured to select the second mobile device from the group based on the location of the second mobile device being closer to the location of the selected one vendor than the locations of the other mobile devices of the group.

In further features, the location of the first mobile device includes a section, a row, and a seat number.

In further features, the selection module is configured to select the group based on the mobile devices of the group being associated in memory with the section of the first mobile device.

In further features, the selection module is configured to select the group based on the mobile devices of the group being associated in memory with sections that are within one section of the section of the first mobile device.

In further features, the vendor selection module is configured to select the one vendor of the plurality of vendors at the property to supply the one or more items of the order based on the location of the first mobile device.

In further features, the vendor selection module is configured to select the one vendor of the plurality of vendors based on a location of the selected one vendor being closer to the location of the first mobile device than other locations of other ones of the plurality of vendors.

In further features, the one or more items include at least one of a food item and a beverage item.

In further features, the one or more items include at least one merchandise item.

In further features, location modules are located throughout the property and configured to, every predetermined period, transmit a predetermined signal and a unique identifier, where the mobile devices are configured to determine signal strength indicators based on ones of the predetermined signals received from ones of the location modules, respectively, and to transmit the signal strength indicators and the unique identifiers of the ones of the location modules, respectively, to the location determination module, and where the location determination module is configured to determine a location of one of the mobile devices within the boundaries of the property based on the signal strength indicators and the unique identifiers of the ones of the location modules.

In further features, the location determination module is configured to: determine locations of the ones of the location modules within the boundaries of the property based on the unique identifiers of the ones of the location modules, respectively, and determine the location of the one of the mobile devices based on the signal strength indicators and the locations of the ones of the location modules, respectively.

In further features, the location modules are located throughout the property such that the predetermined signals are received from at least two of the location modules everywhere within the boundaries of the property.

In further features, the location modules are located throughout the property such that the predetermined signals are received from at least three of the location modules everywhere within the boundaries of the property.

In further features, the selection module is configured to receive the location of the first mobile device with the order.

In further features, the location module is configured to determine the location of the first mobile device.

In further features, location modules are located throughout the property and configured to, every predetermined period, transmit a predetermined signal and a unique identifier, where the first mobile device is configured to determine signal strength indicators based on ones of the predetermined signals received from ones of the location modules, respectively, and to transmit the signal strength indicators and the unique identifiers of the ones of the location modules, respectively, to the location determination module, and where the location determination module is configured to determine the location of the first mobile device based on the signal strength indicators and the unique identifiers of the ones of the location modules.

In further features, the device communication module is configured to transmit the location of the selected one vendor and the location of the first mobile device in response to receipt of a confirmation of an intent to deliver the order to the location of the first mobile device.

In further features, the second mobile device is configured to transmit the confirmation of the intent to deliver the order to the location of the first mobile device in response to receipt of user input to the second mobile device.

In further features, a vehicle system includes: the ordering management system; and a vehicle configured to: wirelessly connect to the first mobile device; and selectively at least one of: unlock one or more doors of the vehicle; and start the vehicle, where the location of the first mobile device is the location of the vehicle.

In a feature, an ordering management method for a property includes: determining locations of mobile devices that are located within boundaries of the property; in response to receipt of an order from a first mobile device for delivery of one or more items to a location of the first mobile device within the boundaries of the property: selecting one vendor of a plurality of vendors at the property to supply the one or more items of the order; determining a group of the mobile devices based on the location of the first mobile device; and selecting a second mobile device from the group based on the location of the second mobile device and a location of the selected one vendor; selectively transmitting, to the second mobile device, the location of the selected one vendor for pickup of the order and the location of the first mobile device for delivery of the order; and selectively transmitting the order including the one or more items to the selected one vendor.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

In this application, including the definitions below, the terms "module" and "system" may refer to, be part of, or include circuits or circuitry that may include processor hardware (shared, dedicated, or group) that executes code and memory hardware (shared, dedicated, or group) that stores code executed by the processor hardware. The code is configured to provide the features of the modules and systems described herein. In addition, in this application the terms "module" and "system" may be replaced with the term "circuit." The term "memory hardware" may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as JavaScript Object Notation (JSON), hypertext markup language (HTML) or extensible markup language (XML); (ii) assembly code; (iii) object code generated from source code by a compiler; (iv) source code for execution by an interpreter; (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An ordering management system for a property, comprising:
   a group of mobile devices including:
   a first mobile device of a first attendee of an event at the property having a first ticket to the event at the property, the first attendee being a non-employee of the property; and
   a second mobile device of a second attendee of the event at the property having a second ticket to the event at the property, the second attendee being a non-employee of the property;
   an order management module configured to communicate with the mobile devices of the group of mobile devices via a network, the order management module including:
   a location module configured to determine locations of the mobile devices that are located within boundaries of the property;
   a selection module configured to, in response to receipt of an order from an application of the first mobile device for delivery of one or more items to a seat location of the first mobile device within the boundaries of the property on the first ticket:
   select one vendor of a plurality of vendors at the property to supply the one or more items of the order; and
   select the second mobile device from the group of mobile devices based on the location of the second mobile device being not at a second seat on the second ticket, the second seat being within a first predetermined distance of the seat location on the first ticket, and within a second predetermined distance of a location of the selected one vendor;
   a device communication module configured to, in response to receipt of user input indicative of a confirmation to deliver the order by the second attendee from an application of the second mobile device, transmit over the network, to the second mobile device, a pickup request including the location of the selected one vendor for pickup of the order and the location of the first mobile device for delivery of the order; and
   a vendor communication module configured to, in response to the receipt of the user input indicative of the confirmation to deliver the order by the second attendee from the second mobile device, transmit the order including the one or more items over the network to a vendor computing device of the selected one vendor, the selected one vendor preparing the order and the second attendee with the second mobile device picking up the order from the selected one vendor and delivering the order to the first attendee with the first mobile device.

2. The order management system of claim 1 wherein the selection module is configured to select the second mobile device from the group further based on the location of the second mobile device being closer to the location of the selected one vendor than the locations of the other mobile devices of the group.

3. The order management system of claim 1 wherein the seat location of the first mobile device includes a section, a row, and a seat number.

4. The order management system of claim 1 wherein the vendor selection module is configured to select the one vendor of the plurality of vendors at the property to supply the one or more items of the order based on the seat location of the first mobile device.

5. The order management system of claim 4 wherein the vendor selection module is configured to select the one vendor of the plurality of vendors based on a location of the selected one vendor being closer to the seat location of the first mobile device than other locations of other ones of the plurality of vendors.

6. The order management system of claim 1 wherein the one or more items include at least one of a food item and a beverage item.

7. The order management system of claim 1 wherein the one or more items include at least one merchandise item.

8. The order management system of claim 1 further comprising location modules located throughout the property and configured to, every predetermined period, transmit a predetermined signal and a unique identifier,
wherein the mobile devices are configured to determine signal strength indicators based on ones of the predetermined signals received from ones of the location modules, respectively, and to transmit the signal strength indicators and the unique identifiers of the ones of the location modules, respectively, to the location determination module, and
wherein the location determination module is configured to determine a location of one of the mobile devices within the boundaries of the property based on the signal strength indicators and the unique identifiers of the ones of the location modules.

9. The order management system of claim 8 wherein the location determination module is configured to:
determine locations of the ones of the location modules within the boundaries of the property based on the unique identifiers of the ones of the location modules, respectively, and
determine the location of the one of the mobile devices based on the signal strength indicators and the locations of the ones of the location modules, respectively.

10. The order management system of claim 8 wherein the location modules are located throughout the property such that the predetermined signals are received from at least two of the location modules everywhere within the boundaries of the property.

11. The order management system of claim 8 wherein the location modules are located throughout the property such that the predetermined signals are received from at least three of the location modules everywhere within the boundaries of the property.

12. The order management system of claim 1 wherein the selection module is configured to receive the seat location of the first mobile device with the order.

13. The order management system of claim 12 wherein the location module is configured to determine the seat location of the first mobile device.

14. The order management system of claim 13 further comprising location modules located throughout the property and configured to, every predetermined period, transmit a predetermined signal and a unique identifier,
wherein the first mobile device is configured to determine signal strength indicators based on ones of the predetermined signals received from ones of the location modules, respectively, and to transmit the signal strength indicators and the unique identifiers of the ones of the location modules, respectively, to the location determination module, and
wherein the location determination module is configured to determine the seat location of the first mobile device based on the signal strength indicators and the unique identifiers of the ones of the location modules.

15. A vehicle system comprising:
the ordering management system of claim 1; and
a vehicle configured to:
wirelessly connect to the first mobile device; and
selectively at least one of:
unlock one or more doors of the vehicle; and
start the vehicle,
wherein the location of the first mobile device is the location of the vehicle.

16. An ordering management method for a property, comprising:
by one or more processors, communicating with a group of mobile devices via a network, the group of mobile devices including:
a first mobile device of a first attendee of an event at the property having a first ticket to the event at the property, the first attendee being a non-employee of the property; and
a second mobile device of a second attendee of the event at the property having a second ticket to the event at the property, the second attendee being a non-employee of the property;
by the one or more processors, determining locations of the mobile devices that are located within boundaries of the property;
by the one or more processors, in response to receipt of an order from an application of the first mobile device for delivery of one or more items to a seat location of the first mobile device within the boundaries of the property on the first ticket:
selecting one vendor of a plurality of vendors at the property to supply the one or more items of the order; and
selecting the second mobile device from the group of mobile devices based on the location of the second mobile device being not at a second seat on the second ticket, the second seat being within a first predetermined distance of the seat location on the first ticket, and within a second predetermined distance of a location of the selected one vendor;
by the one or more processors, in response to receipt of user input indicative of a confirmation to deliver the order by the second attendee from an application of the second mobile device, transmitting over the network, to the second mobile device, a pickup request including the location of the selected one vendor for pickup of the order and the location of the first mobile device for delivery of the order; and
by the one or more processors, in response to the receipt of the user input indicative of the confirmation to deliver the order by the second attendee from the second mobile device, transmitting the order including the one or more items over the network to a vendor computing device of the selected one vendor, the selected one vendor preparing the order and the second attendee with the second mobile device picking up the order from the selected one vendor and delivering the order to the first attendee with the first mobile device.

17. An ordering management system for a property, comprising:
one or more processors; and
memory including code that, when executed by the one or more processors, cause the one or more processors to:

communicate with a group of mobile devices via a network, the group of mobile devices including:
- a first mobile device of a first attendee of an event at the property having a first ticket to the event at the property, the first attendee being a non-employee of the property; and
- a second mobile device of a second attendee of the event at the property having a second ticket to the event at the property, the second attendee being a non-employee of the property;

determine locations of the mobile devices that are located within boundaries of the property;

in response to receipt of an order from an application of the first mobile device for delivery of one or more items to a seat location of the first mobile device within the boundaries of the property on the first ticket:
- select one vendor of a plurality of vendors at the property to supply the one or more items of the order; and
- select the second mobile device from the group of mobile devices based on the location of the second mobile device being not at a second seat on the second ticket, the second seat being within a first predetermined distance of the seat location on the first ticket, and within a second predetermined distance of a location of the selected one vendor;

in response to receipt of user input indicative of a confirmation to deliver the order by the second attendee from an application of the second mobile device, transmit over the network, to the second mobile device, a pickup request including the location of the selected one vendor for pickup of the order and the location of the first mobile device for delivery of the order; and in response to the receipt of the user input indicative of the confirmation to deliver the order by the second attendee from the second mobile device, transmit the order including the one or more items over the network to a vendor computing device of the selected one vendor, the selected one vendor preparing the order and the second attendee with the second mobile device picking up the order from the selected one vendor and delivering the order to the first attendee with the first mobile device.

* * * * *

UNITED STATES PATENT AND TRADEMARK OFFICE
CERTIFICATE OF CORRECTION

PATENT NO. : 11,501,228 B2
APPLICATION NO. : 16/942999
DATED : November 15, 2022
INVENTOR(S) : Sibu Varughese et al.

It is certified that error appears in the above-identified patent and that said Letters Patent is hereby corrected as shown below:

On the Title Page

Page 2, Column 2, Other Publications, Line 5: Delete "Sear" and insert --Seat-- therefor Signed and Sealed this
Third Day of January, 2023

Katherine Kelly Vidal
*Director of the United States Patent and Trademark Office*